United States Patent [19]

Yamakawa

[11] Patent Number: 4,792,685
[45] Date of Patent: Dec. 20, 1988

[54] PHOTOELECTRIC SENSOR

[76] Inventor: Masami Yamakawa, Kenei Hakuyodai Apt. 14-301, Kashio-cho 757, Totsuka-Ku, Yokohama-Shi, Japan

[21] Appl. No.: 43,946

[22] Filed: Apr. 29, 1987

[51] Int. Cl.⁴ .................. G02B 17/00; G01J 5/08
[52] U.S. Cl. .................. 250/353; 250/342; 350/620; 350/625
[58] Field of Search .......... 250/353, 342; 350/620, 350/619, 618, 625

[56] References Cited

U.S. PATENT DOCUMENTS 3,059,113 10/1962 McHenry .................. 250/353

FOREIGN PATENT DOCUMENTS 187180 7/1986 European Pat. Off. ............ 250/342
200132 10/1985 Japan ................................ 250/353
997872 7/1965 United Kingdom ................ 250/353

Primary Examiner—Janice A. Howell
Assistant Examiner—Constantine Hannaher
Attorney, Agent, or Firm—Kramer, Brufsky & Cifelli

[57] ABSTRACT

A photoelectric sensor comprises a light collecting block having a reflective mirror formed on an inner surface of a light transmitting window and a concave mirror including a light passing portion, whereby the reflective mirror is opposed to the concave mirror. Further, the photoelectric sensor comprises an electronic circuit block having a photoelectric element, a plurality of electronic components and a wiring substrate, wherein the photoelectric element is positioned on a light collecting point of the light collecting block.

8 Claims, 4 Drawing Sheets

PHOTOELECTRIC SENSOR

BACKGROUND OF THE INVENTION (1) Field of the Invention

This invention relates to a photoelectric sensor which is provided with a light collecting optical system and a photoelectric element.

(2) Description of the Prior Art

According to a conventional photoelectric sensor, a convex lens is disposed in a circular opening which is formed on a front wall of a box-shaped casing, and a luminescent diode or a photoelectric element such as a photo transistor is positioned on a focal point of the convex lens.

FIG. 5 shows a section view of such a conventional photoelectric sensor, in which symbol A denotes a convex lens disposed on front wall of a casing B. Numeral 21 denotes a photoelectric element positioned on a focal point of the convex lens A. Numeral 22 denotes a wiring substrate, while numeral 23 denotes various electronic parts mounted on the wiring substrate 22. Numeral 24 denotes a motion indicator lamp. Symbol C denotes a cable connecting both the motion indicator lamp 24 and the wiring substrate 22. Further, numeral 3 denotes a rear panel of the casing B.

In recent years, the structure of the photoelectric sensor becomes more compact and more small-sized year by year to respond to the users' requirements. However, there exist two problems which hinder a production of a compact photoelectric sensor.

Firstly, an assembling efficiency of the photoelectric sensor becomes lower as the structure of the photoelectric sensor casing becomes smaller. More specifically, when installing various electronic components on an inner wall of the casing, it is required to carry out such an assembling by inserting a driver, pincers, a soldering iron and other tools into the interior of the casing. Accordingly, as the structure of the photoelectric sensor becomes smaller, the assembling work becomes more cumbersome.

Secondly, since the convex lens is employed to collect lights, there is demanded a considerably broader space, i.e. a conical space for collecting the lights toward the photoelectric element positioned on a focal point of the convex lens.

In other words, in order to enhance the performance of the photoelectric sensor, it is desirable to enlarge a caliber of the convex lens and increase the collecting amount of the lights. Thus, a focal distance of the convex lens becomes longer, whereby the effect of any outer disturbing light becomes less. Therefore, a convex lens having a larger caliber and a long focal distance, as well as a broader conical space is necessitated.

As discussed above, up to now a desire to make more compact the photoelectric sensor casing is inconsistent with the betterment of its optical performance.

BRIEF SUMMARY OF THE INVENTION

Therefore, it is a general object of this invention to provide a photoelectric sensor which has a good assembling efficiency, a superior optical performance and a compact construction by overcoming the two problems hindering a production of a compact and small-sized photoelectric sensor.

More specifically, the photoelectric sensor comprises a light collecting block having a reflective mirror formed on an inner surface of a light transmitting window and a concave mirror including a light passing portion, whereby the reflective mirror is opposed to the concave mirror. Further, the photoelectric sensor comprises an electronic circuit block having a photoelectric element, a plurality of electronic components and a wiring substrate, wherein the photoelectric element is positioned on a light collecting point of the light collecting block.

Other objects, features and advantages of this invention will be readily apparent from the following description of preferred embodiments thereof, taken in connection with the accompanying drawings, although variations and modifications may be effected without departing from the spirit and scope of the novel concepts of the disclosure.

BRIEF DESCRIPTION OF THE ACCOMPANYING DRAWINGS

DETAILED DESCRIPTION OF PREFERRED EMBODIMENTS

Preferred embodiments of this invention will now be described with reference to the accompanying drawings.

Figure 1:
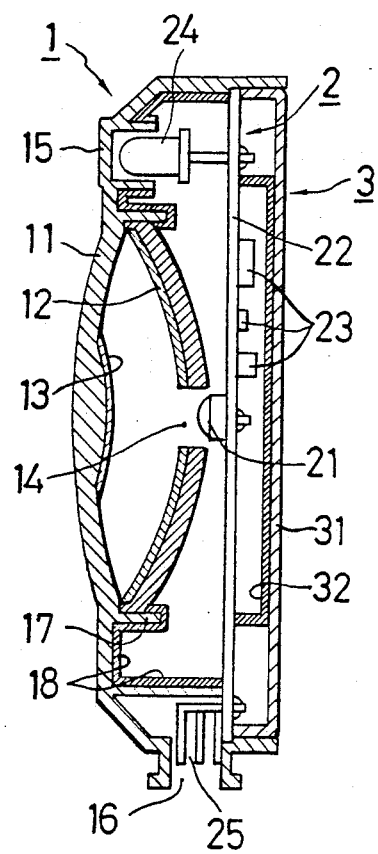
FIG. 1 is a section view of a photoelectric sensor according to a first embodiment of this invention.

FIG. 1 shows a section view of a light receiving means in a photoelectric sensor according to a first embodiment of this invention.

The light receiving means is effective to output electric signals by receiving signal lights emitted from a light projector(not illustrated) with a photoelectric element 21 as a phototransistor, and comprises a light collecting block 1 and an electronic circuit block 2.

The light collecting block is made of a transparent resinous material capable of cutting off a visible light of no more than 800 nm in wavelength. Such transparent resinous material has a capability to pass near infrared rays therethrough. The light collecting block 1 comprises a light transmitting circular window 11 at its central part, a peeping window 15 at its upper part and a plug-in hole 16 at its lower part. Formed centrally upon an inner surface of the light transmitting window 11 is a convex mirror 13 by a vacuum evaporation. The diameter of the convex mirror 13 is about one-third of that of the light transmitting window 11. The light transmitting window 11 is, on its outer circumference, provided with a supporting frame 17.

Numeral 12 is a concave mirror which is disposed so as to oppose to the convex mirror 13. The concave mirror 12 is, on its central part, provided with a light passing opening 14, and fixed with the supporting frame 17. As illustrated clearly in FIG. 2, the concave mirror 12 constitutes a light collecting optical system for collecting and reflecting signal lights L.

The inner surface of the light collecting block 1 excluding the light transmitting window 11 and the peeping window 15 is formed by a membrane for preventing invasion of any harmful outer disturbing light or any electric noise. Such preventive membrane 18 is formed by metal evaporation or coating.

Numeral 2 is an electronic circuit block which is disposed behind the concave mirror 12. The electronic circuit block 2 comprises a wiring substrate 22, upon which are mounted a photoelectric element 21, a plurality of electronic parts 23, a motion indicator lamp 24 and a wiring connector 25.

The photoelectric element 21 which forms a phototransistor or a photodiode is disposed on a position to conform to a light collecting point(i.e. focal point) of the light collecting block 1. The motion indicator lamp 24 is fitted in a recess of the peeping window 15. The wiring connector 25 is fitted in the plug-in hole 16. A plurality of electronic parts 23 are fixed on a preferred position of the wiring substrate 22.

Numeral 3 is a panel for sealing and closing the electronic circuit block 2, which comprises an insulating panel 31 and a conductive surface 32 of e.g. a metal plate formed on an inner surface of the insulating panel 31.

In other words, the panel 3 performs a function of a cover plate of the photoelectric sensor, and the conductive surface 32 of the panel 3 intercepts any outer electric noise and prevents any error operation of the electronic circuit block 2.

Referring more in detail to the light collecting block 1, the signal lights L emitted from the light projector(not illustrated) reach the concave mirror 12 through the light transmitting window 11, and then are reflected thereupon. The reflected lights are converged toward a focal point $f_l$ of the concave mirror 12, but again reflected by the convex mirror 13 disposed immediately before the focal point $f_l$ and the reflected lights are converged toward the light collecting point $f_2$. The collected signal lights L are applied to the photoelectric element 21 where they are converted into electric signals, and then amplified by an amplifier consisting of the plurality of electronic parts 23 such as transistors, diodes, integrated circuits, condensors, resistors, etc. Thus, the amplified signals are outputted by the wiring connector 25, thereby the motion indicator lamp 24 is lighted up. The wiring connector 25 is effective to provide an electric source which the electronic circuit block 2 needs. According to this embodiment, the mirror 13 is a convex one, but when it is desired to shorten the focal distance, it is possible to employ a plane mirror in lieu of the convex mirror 13. Preferably, the surface of the light transmitting window 11 is not simply plane, but curved to a certain degree, thereby enabling correction of a spherical aberrator or adjustment of the focal distance. If the concave mirror 12 is as a whole made of a transparent resinous material without forming the built-in light passing opening 14, it is possible to seal the built-in optical system, thereby the surfaces of the concave mirror 12 and the convex mirror 13 cannot be dewed by any humid outer air. Further, the insulating panel 31 may be replaced with an integral closure of the electronic components by a transfer molding process or an injection molding process, whereby the humidity resistance and waterproof properties of the electronic circuit block 2 can be increased. A second embodiment of this invention will now be described in connection with FIG. 3.

Figure 3:
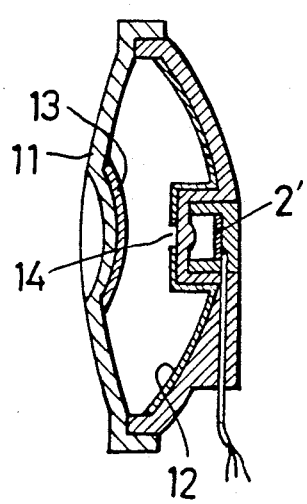
FIG. 3 is a section view of a photoelectric sensor according to a second embodiment of this invention.

In FIG. 3, all electronic components disposed on the electronic circuit block 2 of the first embodiment are integrated together, and their functions are affected by one-chip integrated circuit 2' which is anchored behind the light passing opening 14. Thus, the light receiving device of the photoelectric sensor may be compact in size and manufactured at a lower cost.

Figure 4:
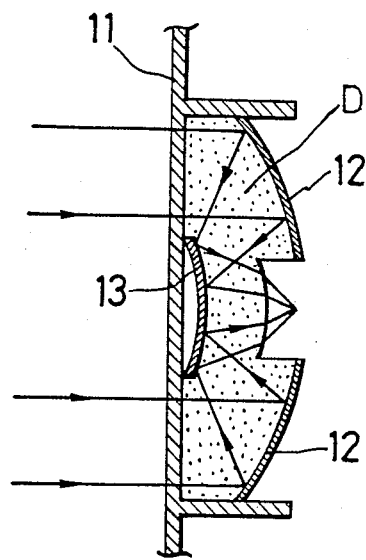
FIG. 4 is a section view of a photoelectric sensor according to a third embodiment of this invention.
Figure 5:
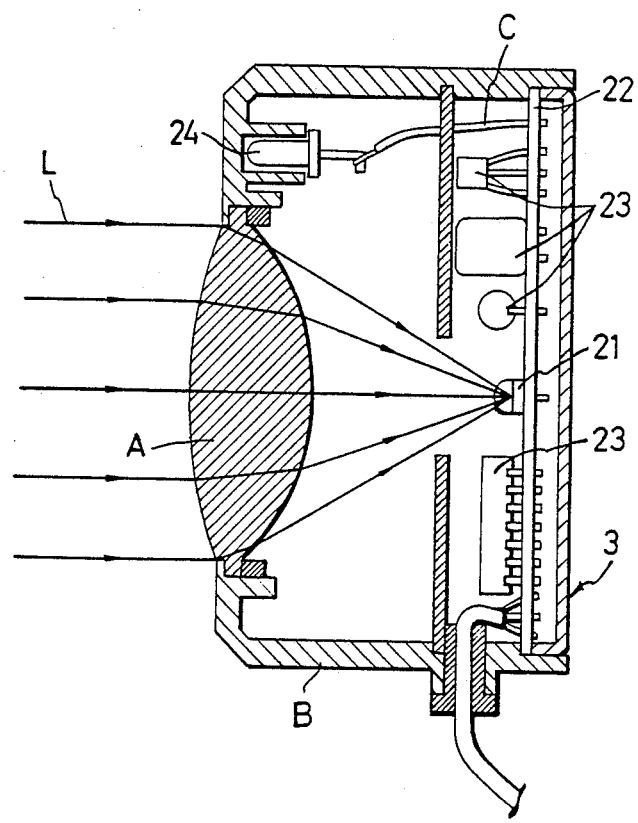
FIG. 5 is a section view of a conventional photoelectric sensor.

FIG. 4 shows a section view of a third embodiment, in which the convex mirror 13 and the concave mirror 12 are integrally disposed on both sides of a transparent lens body D. Namely, the convex mirror 13 is disposed on a front side of the transparent lens body D, while the concave mirror 12 is disposed on a rear side thereof. Both the convex and concave mirror 12, 13 can be disposed by means of the vacuum evaporation.

As discussed previously, the photoelectric sensor of this invention has succeeded in removing a very cumbersome manual assembling work including an inserting work of various tools into a narrow interior of the photoelectric sensor casing. Thus, the present photoelectric sensor can be manufactured in a mass production system by use of automatic assembling machines.

Further, the width of the photoelectric sensor device is as a whole shortened, i.e. formed about one-third or less shorter than that of the conventional photoelectric sensor device.

Accordingly, when installing the present photoelectric sensor in plants, offices, houses or the like, it is not required to anchor it in a recess formed on a wall. The present photoelectric sensor may be suspended on the wall by a simple mounting means.

Figure 2:
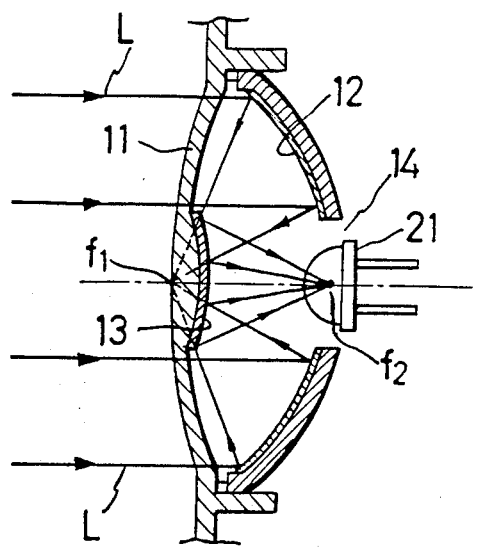
FIG. 2 is a detailed section view of a light collecting block in FIG. 1.

Further, since the caliber of the transparent light transmitting window is broader despite that the structure of the photoelectric sensor device is compact, the light collecting amount is inceased. In addition, the focal distance is extended by means of reflection(as shown in FIG. 2), so that sensibility of light is enhanced.

Further, since an image of the luminescent diode of the light projector is converged accurately by the photoelectric sensor, the brightness is increased highly. Because of such multiplied effects, it is possible to extend remarkably a distance between the light projector and the light receiving device. In addition, it is also possible to extend a distance between the photoelectric sensor and an object to be detected, thereby enabling a very easy detection of such object.

Further, if all the electronic components disposed on the electronic circuit block are integrated as one-chip large-sized integral circuit, they can be transformed into a lens-shaped compact structure. Thus, a very compact and highly reliable photoelectric sensor can be obtained.

What is claimed is:

1. A photoelectric sensor comprising:
   a transparent optical body having a front surface to receive incident light and a rear surface, said front surface having a first region and a second, larger window region to admit light into said transparent optical body, said rear surface having a convex outer region and a central recess region to receive a photoelectric element;
   a concave mirror adjacent to said concave outer region of said rear surface to reflect toward said first region of said front surface light transmitted through said window region of said front surface; and
   a second mirror located adjacent to said first region of said front surface to reflect toward said photoelectric element light received from said concave mirror.

2. A photoelectric sensor as set forth in claim 1 wherein said recess region of said rear surface of said optical body has a convex surface located between said second mirror and said photoelectric element to converge light reflected by said second mirror onto said photoelectric element.

3. A photoelectric sensor as set forth in claim 1 further comprising a housing covering and enclosing said front surface of said transparent optical body to seal said second mirror with said front surface, said housing including a transparent portion in contact with said window region of said front surface.

4. A photoelectric sensor as set forth in claim 3 wherein both said transparent optical body and housing comprises a resinous material which passes near infrared to visible light of not more than 800 nanometers in wave length.

5. A photoelectric sensor as set forth in claim 1 wherein said transparent optical body comprises transparent synthetic resins, and both said second and concave mirrors are formed by vacuum evaporation.

6. A photoelectric sensor as set forth in claim 1 wherein said transparent optical body is a unitary resinous body, said first region on said front surface is concave, said second mirror is coated on said first region of said front surface, and said concave mirror is coated on said convex outer region of said rear surface.

7. A photoelectric sensor as set forth in claim 1 further comprising:
a plate supported adjacent to said rear surface of said transparent optical body;
said photoelectric element supported by said plate within said central recess region of said rear surface of said transparent optical body;
a motion indicator lamp supported by said plate adjacent to said front surface of said transparent optical body; and
electronic means, mounted to said plate and coupled to said photoelectric element and said motion indicator lamp, for amplifying an output of said photoelctric element and driving said motion indicator lamp.

8. A photoelectric sensor as set forth in claim 1 wherein said first region of said front surface is concave and approximately centered on said front surface, and said window region of said front surface is flat, is approximately prependicular to a central axis of said optical body and surrounds said first region.

* * * * *